United States Patent
Obuchi et al.

(10) Patent No.: US 7,132,490 B2
(45) Date of Patent: Nov. 7, 2006

(54) LACTIC ACID-BASED RESIN COMPOSITION

(75) Inventors: Shoji Obuchi, Ichihara (JP); Nobuyuki Maki, Ichihara (JP); Hitoshi Tachino, Ichihara (JP)

(73) Assignees: Mitshi Chemicals, Inc., Tokyo (JP); Du Pont-Mitsui Polychemicals Co., Ltd., Tokyo (JP)

( * ) Notice: Subject to any disclaimer, the term of this patent is extended or adjusted under 35 U.S.C. 154(b) by 0 days.

(21) Appl. No.: 10/506,439

(22) PCT Filed: Mar. 28, 2003

(86) PCT No.: PCT/JP03/03970

§ 371 (c)(1),
(2), (4) Date: Sep. 2, 2004

(87) PCT Pub. No.: WO03/082980

PCT Pub. Date: Oct. 9, 2003

(65) Prior Publication Data

US 2005/0151296 A1    Jul. 14, 2005

(30) Foreign Application Priority Data

Mar. 29, 2002    (JP) .............................. 2002-094317

(51) Int. Cl.
*C08F 120/68*    (2006.01)
(52) U.S. Cl. .................. 526/317.1; 526/318; 526/319; 526/320
(58) Field of Classification Search ................ 442/327, 442/414; 525/450, 424, 434, 437; 428/364, 428/397; 526/317.1, 318, 319, 320
See application file for complete search history.

(56) References Cited

U.S. PATENT DOCUMENTS 5,206,341 A    4/1993    Ibay et al.

FOREIGN PATENT DOCUMENTS

| CN | 1050203 A | | 3/1991 |
|---|---|---|---|
| JP | 4-334448 A | | 11/1992 |
| JP | 6-299077 A | | 10/1994 |
| JP | 08333550 A | * | 6/1995 |
| JP | 8-290526 A | | 11/1996 |
| JP | 10-501560 A | | 2/1998 |
| JP | 2001-123055 A | | 5/2001 |

* cited by examiner

*Primary Examiner*—Robert D. Harlan
(74) *Attorney, Agent, or Firm*—Buchanan Ingersoll PC

(57) ABSTRACT

Provided is a lactic acid-based resin composition that comprises a lactic acid-based resin (component (A)), and an ethylene-unsaturated carboxylic acid copolymer (component (B)) and/or an ethylene-unsaturated carboxylic acid copolymer ionomer (component (C)). The lactic acid-based resin composition has good physical properties in melt and can be efficiently formed into films and laminates through casting or extrusion lamination. The paper laminates obtained through extrusion lamination with the resin composition have good moisture barrier property, and have the advantages of good antibacterial ability, good biodegradability and low combustion heat. And the moldings obtained from the resin composition of the invention have a characteristic which is excellent in impact strength. Further, the films and sheets formed of the resin composition have good low-temperature heat-sealability and hot-tack sealability, and the resin composition well serves as a sealant. The resin composition is favorable to various materials in a broad range, for example, for wrapping and packaging materials for foods, drinks, electronic appliances, medicines and cosmetics, for materials for use in agriculture, civil engineering and construction and for materials for compost, etc.

6 Claims, No Drawings

LACTIC ACID-BASED RESIN COMPOSITION

FIELD OF THE INVENTION

The present invention relates to a lactic acid-based resin composition and its moldings, and to a method for producing them. More precisely, the invention relates to a lactic acid-based resin composition which is highly safe and is well biodegradable after use, to paper laminates that comprise the resin composition, and to a method for producing them.

BACKGROUND OF THE INVENTION

In general, resins of polyethylene, polypropylene, polyethylene terephthalate and others are used in paper laminates. However, when disposed of after use, they will increase the amount of their wastes. In addition, since they do not almost degrade in the natural environment, they will semi-permanently remain in the ground even after disposed of for land reclamation. Moreover, some plastic wastes are further problematic in that they destroy the scenery and even the living environment of marine organisms.

To solve these problems, polyhydroxycarboxylic acids such as polylactic acid, and aliphatic polyesters derived from aliphatic polyalcohols and aliphatic polycarboxylic acids have been developed these days for biodegradable thermoplastic polymer resins.

These polymers are characterized in that they may 100% biodegrade in animal bodies within a period of from a few months to one year, or when kept wetted in soil or seawater, they begin to degrade in a few weeks and completely degrade within a period of from about one year to a few years, and their degradation products are lactic acid, and carbon dioxide and water all harmless to human bodies.

In particular, the application of polylactic acid is expected to expand since its starting material, L-lactic acid has become mass-produced through inexpensive large-scale fermentation and since the polymer has good properties in that it rapidly degrades in compost and is resistant to fungi and it causes little odorization and discoloration of foods and drinks that contain it.

The following patent publications are referred to herein.

JP-A-4-334448 discloses a technique that relates to a biodegradable composite material and its production method.

Specifically, the composite material of the technique disclosed is produced by coating the surface of a substrate that contains vegetable fibers, with a polylactic acid or its derivative. This is highly resistant to water and oil and is highly biodegradable, and this is favorable for wrapping and packaging paper for foods and drinks and for wrapping and packaging materials for medical use.

The composite material is biodegradable and biocompatible, and when disposed of after use, it is naturally biodegraded by the action of microorganisms in soil and water and therefore does not pollute the natural environment. This is produced by coating the surface of a substrate that contains vegetable fibers, with a polylactic acid or its derivative. The substrate is formed of a material that consists essentially of various vegetable fibers. It includes, for example, paper such as woodfree paper, shoji paper; yarn and rope of cotton, Manila hemp or the like; containers, nets and others formed of them.

Polylactic acid for use herein includes poly-D-lactic acid, poly-L-lactic acid, and poly-D,L-lactic acid; and its derivatives are, for example, polylactic acid-glycolic acid copolymers and polylactic acid-glycerin copolymers.

JP-A-8-290526 discloses a technique that relates to an aluminium-biodegradable plastic laminate. When disposed of in the ground, the laminate readily biodegrades. This is a laminate of an aluminium material and a biodegradable plastic that generates acid when it degrades. The aluminium material includes aluminium foil, aluminium deposit layer, etc. The biodegradable plastic may be in any form of film, adhesive, ink, etc. The biodegradable plastic that generates acid when it degrades includes 3-hydroxybutyric acid-3-hydroxyvaleric acid copolymers, condensates of aliphatic diols and aliphatic dicarboxylic acids, polylactic acid prepared through polymerization of lactic acid, etc. These biodegradable plastics generate their starting acids such as aliphatic dicarboxylic acids or lactic acid. The acid acts on the aluminium material to convert it into aluminium oxide, and the aluminium material is thereby decomposed and lost.

However, the melt tension of lactic acid-based resin such as polylactic acid is low, and the resin melt therefore greatly necks in when extruded out through a die hole in extrusion lamination molding. As a result, the selvage of the resin laminate produced significantly fluctuates and the laminate is often difficult to wind up. Further, thin laminates with the resin are often cut and broken while produced, and, if so, their safe production is impossible.

Moreover, the thickness fluctuation of the resin layer of the paper laminates produced is great, and under ordinary molding conditions in ordinary molding machines, the width of the laminate that is substantially uniform in the cross direction is approximately from 80 to 85% or so of the total laminate width.

Adding a peroxide to polylactic acid is generally known method of increasing the melt tension of the resin. This is for crosslinking the polymer during its extrusion pelletization or extrusion molding (JP-A-10-501560).

The method is surely effective for increasing the melt tension of polymer, but has many industrial problems such as those mentioned below:

<1> The polymer is much crosslinked to give gel, and the films formed of it have many fish eyes and therefore have no commercial value;

<2> The reaction is difficult to control, and the reproducibility of the method to give the intended crosslinked products is not good;

<3> The peroxide requires an additional apparatus for safely handling it.

On the other hand, JP-A-2001-123055 discloses a mixture of polyolefin such as polyethylene or polypropylene generally used for extrusion lamination, and microorganism-degradable thermoplastics or polylactic acid.

However, though an apparent melt tension of the mixture is increased, the mixture has problems such as those mentioned below:

<1> It is impossible to obtain a uniform molding,

<2> A heat-seal strength of the film extremely decreases by lamellar peeling and, <3> An impact strength of the molding extremely decreases by lamellar peeling.

As in the above, it is substantially impossible to obtain laminates of polylactic acid through conventional extrusion lamination in the current situation in the art.

DISCLOSURE OF THE INVENTION

An object of the invention is to provide the following, not detracting from the antibacterial ability and biodegradability intrinsic to the polylactic acid:

<1> A lactic acid-based resin composition that may be efficiently formed into moldings through extrusion lamination;

<2> A paper laminate of the lactic acid-based resin composition;

<3> A method of producing the paper laminate.

We, the present inventors have assiduously studied concerning special polymers that are compatible with lactic acid-based resin and have the ability to greatly increase the melt tension of the resin when mixed with it and melted under heat, and, as a result, have found that a specific polymer can satisfy the above-mentioned object. On the basis of this finding, we have completed the present invention.

Specifically, the invention is characterized by the following [1] to [6]:

[1] A lactic acid-based resin composition that comprises a lactic acid-based resin (component (A)), and an ethylene-unsaturated carboxylic acid copolymer (component (B)) and/or an ethylene-unsaturated carboxylic acid copolymer ionomer (component (C)).

[2] A molding formed of the lactic acid-based resin composition of [1].

[3] A single-layer film formed of the lactic acid-based resin composition of [1].

[4] A laminate that contains a layer formed of the lactic acid-based resin composition of [1].

[5] A paper laminate that contains a layer formed of the lactic acid-based resin composition of [1] and a paper layer.

[6] A method for producing paper laminates, which comprises mixing a lactic acid-based resin (component (A)) with an ethylene-unsaturated carboxylic acid copolymer (component (B)) and/or an ethylene-unsaturated carboxylic acid copolymer ionomer (component (C)), and followed by melt-extruding the resulting lactic acid-based resin composition onto a paper layer to produce a paper laminate that comprises the resin layer and the paper layer.

DESCRIPTION OF THE PREFERRED EMBODIMENTS

The invention is described in detail hereinunder.

[Lactic Acid-based Resin]:

The lactic acid-based resin for use in the invention is meant to indicate a polymer in which the content of the lactic acid component is at least 50% by weight in terms of the monomer weight for polymerization. Its specific examples are mentioned below.

<1> Polylactic acid;

<2> Copolymer of lactic acid and any other aliphatic hydroxycarboxylic acid;

<3> Copolymer of lactic acid, aliphatic polyalcohol and aliphatic poly basic acid;

<4> Mixture of <1> to <3> combined in any desired manner;

<5> Mixture of any of above <1> to <4> with a polyester.

Lactic acid for use in the invention includes L-lactic acid, D-lactic acid, DL-lactic acid, their mixtures, and lactide, a cyclic dimer of lactic acid. In particular, when L-lactic acid and D-lactic acid are combined to prepare polylactic acid, it is desirable that the content of any of L-lactic acid or D-lactic acid in the resulting polylactic acid is at least 75% by weight.

[Method for Producing Lactic Acid-based Resin]:

Though not specifically defined, the lactic acid-based resin for use in the invention may be produced, for example, according to any of the following methods:

<1> Lactic acid, or a mixture of lactic acid with an aliphatic hydroxycarboxylic acid is directly polycondensed with dehydration (for example, as in U.S. Pat. No. 5,310,865).

<2> A cyclic dimer of lactic acid (lactide) is melt-polymerized with ring cleavage (for example, as in U.S. Pat. No. 2,758,987).

<3> A cyclic dimer of lactic acid or aliphatic hydroxycarboxylic acid, for example, lactide or glycolide is melt-polymerized with ε-caprolactone with ring opening in the presence of a catalyst (for example, as in U.S. Pat. No. 4,057,537).

<4> A mixture of lactic acid, an aliphatic diol and an aliphatic dibasic acid is directly polycondensed with dehydration (for example, as in U.S. Pat. No. 5,428,126).

<5> Polylactic acid is condensed with a polymer of an aliphatic diol and an aliphatic dibasic acid, in the presence of an organic solvent (for example, as in European Patent Application 0712880A2).

<6> Lactic acid is polycondensed with dehydration in the presence of a catalyst to give a polyester, and this is subjected to solid-phase polymerization at least in a part of the process.

If desired, the polymer resin may be copolymerized with a small amount of an aliphatic polyalcohol such as trimethylolpropane or glycerin, an aliphatic polybasic acid such as butane-tetracarboxylic acid, or a polyol such as polysaccharide, or may be processed with a binder (polymer chain extender) such as a diisocyanate compound to have an increased molecular weight.

[Polyesters]:

The polyesters as referred to herein includes aliphatic polyesters produced from various combinations of aliphatic hydroxycarboxylic acids, aliphatic diols and aliphatic dibasic acids such as those mentioned hereinunder, and aromatic polyesters produced through copolymerization of aromatic polyesters with components such as aliphatic polycarboxylic acids or aliphatic polyalcohols.

The aliphatic polyesters include, for example, polylactic acid, polyethylene succinate, polybutylene succinate, polybutylene succinate adipate, polyhydroxybutyric acid, polyhydroxyvaleric acid, copolymer of β-hydroxybutyric acid and β-hydroxyvaleric acid, polycaprolactone, etc. The biodegradable aromatic polyesters include, for example, polyethylene terephthalate (PET)-based or polybutylene terephthalate (PBT)-based, modified PET and modified PBT.

Especially preferred are polybutylene succinate, polybutylene succinate adipate (Bionole, trade name by Showa Polymer), polycaprolactone (Placcel, trade name by Daicel), modified PET (Biomax®, trade name by DuPont) and modified PBT (Ecoflex, trade name by BASF), as they are readily available and inexpensive.

These polyesters may be processed with a binder such as diisocyanate to have an extended polymer chain, or may be copolymerized with a small amount of an aliphatic polyalcohol such as trimethylolpropane or glycerin, an aliphatic polybasic acid such as butane-tetracarboxylic acid, or a polyalcohol such as polysaccharide.

Further, in the invention, polyesters having a biodegradability may be added as a softening agent in the range of not detracting from the object of the invention.

Not specifically defined, the polyesters may be produced in any method, for example, in the same manner as that for producing PET, PBT or polylactic acid.

[Aliphatic Hydroxycarboxylic Acid]:

Specific examples of the aliphatic hydroxycarboxylic acid for use in the invention are glycolic acid, lactic acid, 3-hydroxybutyric acid, 4-hydroxybutyric acid, 3-hydroxyvaleric acid, 4-hydroxyvaleric acid, 6-hydroxycaproic acid, etc. Also usable are cyclic esters of aliphatic hydroxycarboxylic acids, for example, glycolide, a dimer of glycolic acid, and ε-caprolactone, a cyclic ester of 6-hydroxycaproic acid. One or more of these may be used herein either singly or as combined.

[Aliphatic Dialcohol]:

Specific examples of the aliphatic diol for use in the invention are ethylene glycol, diethylene glycol, triethylene glycol, polyethylene glycol, propylene glycol, dipropylene glycol, 1,3-butanediol, 1,4-butanediol, 3-methyl-1,5-pentanediol, 1,6-hexanediol, 1,9-nonanediol, neopentyl glycol, polytetramethylene glycol, 1,4-cyclohexanedimethanol, 1,4-benzenedimethanol, etc. One or more of these may be used herein either singly or as combined.

[Aliphatic Dibasic Acid]:

Specific examples of the aliphatic dibasic acid for use in the invention are oxalic acid, glutaric acid, adipic acid, pimelic acid, suberic acid, azelaic acid, sebacic acid, undecane-diacid, dodecane-diacid, phenylsuccinic acid, 1,4-phenylene-diacetic acid, etc. One or more of these may be used herein either singly or as combined.

[Molecular Weight of Lactic Acid-based Resin and Polyesters]

The lactic acid-based resin and the polyesters for use in the invention are not specifically defined in point of the weight-average molecular weight (Mw) and the molecular weight distribution, so far as they are substantially moldable. In particular, the weight-average molecular weight of the lactic acid-based resin and the polyesters for use in the invention is not specifically defined so far as the polymers have substantially satisfactory mechanical properties. In general, the weight-average molecular weight (Mw) preferably falls between 30,000 and 1,000,000, more preferably between 50,000 and 750,000, most preferably between 80,000 and 500,000. If the weight-average molecular weight (Mw) of the resin is smaller than 30,000, the mechanical properties of the moldings of the resin composition will be unsatisfactory; but if larger than 1,000,000, the melt viscosity of the resin may be too high and the resin will be difficult to handle and will be uneconomical in producing it.

[Preferred Embodiment of Lactic Acid-based Resin]:

One preferred embodiment of the lactic acid-based resin is a polylactic acid resin.

One preferred example of the polylactic acid resin is Mitsui Chemical's polylactic acid resin, LACEA (trade name).

LACEA brand includes, for example, H-100, H-400, H-440, H-360, H-280, 100J, H-100E, M-151S Q04, M151S Q52, etc.

[Ethylene-unsaturated Carboxylic Acid Copolymer and its Ionomer]:

The unsaturated carboxylic acid unit content of the ethylene-unsaturated carboxylic acid copolymer or its ionomer for use in the invention preferably falls between 2 and 25% by weight, more preferably between 5 and 20% by weight. If the carboxylic unit content thereof is smaller than the range defined above, the copolymer or its ionomer will be incompatible with polylactic acid; but if larger than the range, the copolymer or its ionomer will be extremely difficult to produce and such defects thereof will be noticeable.

Examples of the unsaturated carboxylic acid component of the copolymer or its ionomer are acrylic acid, methacrylic acid, ethacrylic acid, fumaric acid, maleic acid, monomethyl maleate, monoethyl maleate, maleic anhydride, etc. Especially preferred are acrylic acid and methacrylic acid.

Not losing the compatibility with lactic acid-based resin, the copolymer may be further copolymerized with any other unsaturated monomer except ethylene and unsaturated carboxylic acids, but the additional unsaturated monomer content of the copolymer is preferably at most 20% by weight.

Examples of the additional unsaturated monomer are vinyl esters such as vinyl acetate, vinyl propionate; and methyl(meth)acrylate, ethyl(meth)acrylate, isopropyl(meth)acrylate, n-butyl(meth)acrylate, isobutyl(meth)acrylate, 2-ethylhexyl(meth)acrylate, etc. (Meth)acrylic acid as referred to herein means acrylic acid or methacrylic acid.

In the ethylene-unsaturated carboxylic acid copolymer ionomer for use in the invention, from 0 to 90 mol %, preferably from 20 to 80 mol % of the carboxyl group is neutralized with a metal ion. For the metal ion, preferred is a divalent metal such as zinc, magnesium and calcium. More preferred is zinc.

[Preferred Embodiment of Ethylene-unsaturated Carboxylic Acid Copolymer]:

One preferred embodiment of the ethylene-unsaturated carboxylic acid copolymer is ethylene-methacrylic acid copolymer, NUCREL (trade name, produced by Mitsui DuPont Polychemical).

NUCREL brand includes, for example, AN4214C, N0903HC, N0908C, N410, N1035, N1050H, N1108C, N1110H, N1207C, N1214, N1525, N1560, N0200H, AN4311, AN4213C, N035C, etc.

[Preferred Embodiment of Ethylene-unsaturated Carboxylic Acid Copolymer Ionomer]:

One preferred embodiment of the ethylene-unsaturated carboxylic acid copolymer ionomer is HIMILAN (trade name), ionomer resin produced by Mitsui DuPont Polychemical.

HIMILAN brand includes, for example, 1554, 1554W, 1555, 1557, 1601, 1605, 1650, 1652, 1652 SR, 1652 SB, 1702, 1705, 1706, 1707, 1855, 1856, etc.

[Method for Producing Ethylene-unsaturated Carboxylic Acid Copolymer or its Ionomer]:

The ethylene-unsaturated carboxylic acid copolymer for use in the invention may be obtained through copolymerization of ethylene, an unsaturated carboxylic acid and optionally any other unsaturated monomer in a mode of high-pressure radical polymerization. Its ionomer may be obtained through neutralization of the ethylene-unsaturated carboxylic acid copolymer in an ordinary manner.

[Lactic Acid-based Resin Composition]:

The blend ratio of the lactic acid-based resin to the ethylene-unsaturated carboxylic acid copolymer or its ionomer is not specifically defined. Preferably, in the resin composition, the amount of the lactic acid-based resin falls between 1 and 99% by weight and that of the ethylene-unsaturated carboxylic acid copolymer or its ionomer falls between 1 and 99% by weight. Especially for use based on the advantage of antibacterial ability, good biodegradability or low combustion heat of the lactic acid-based resin, the amount of the lactic acid-based resin falls between 50 and 99% by weight, preferably between 60 and 98% by weight, more preferably between 75 and 95% by weight, and that of the ethylene-unsaturated carboxylic acid copolymer or its ionomer falls between 1 and 50% by weight, preferably between 2 and 40% by weight, more preferably between 5 and 25% by weight. If the amount of the ethylene-unsaturated carboxylic acid copolymer or its ionomer is larger than 50% by weight, the resin composition may lose the advantage of antibacterial ability, good biodegradability or low combustion heat of the lactic acid-based resin therein.

The effect of the ethylene-unsaturated carboxylic acid copolymer or its ionomer added to the lactic acid-based resin in the invention includes increasing the melt tension of the resin under heat and improving the molding stability and the productivity in molding the resin composition, and also increasing the water vapor barrier property of the resin moldings obtained.

[Method for Producing Lactic Acid-based Resin Composition]:

The lactic acid-based resin composition of the invention may be produced in any known method, for which employable is any known machine. For example, any mixer such as kneader, single-screw or multi-screw extruder, tumbler or Henschel mixer may be used. Especially preferably, the composition is produced through melt-kneading in a kneading apparatus such as single-screw or twin-screw extruder. It is a matter of importance to well pre-dry the starting components for better moldability of the resin composition.

The lactic acid-based resin composition is not specifically defined in point of the morphology and the size thereof. For example, the resin composition may be in any form of powder, pellets, rods, etc.

[Additive]:

The lactic acid-based resin composition of the invention may contain various additives, depending on its object (for example, for improving the moldability, the secondary workability, the degradability, the tensile strength, the heat resistance, the storage stability and the weather resistance of the resin composition or its moldings). The additives include, for example, plasticizer, antioxidant, UV absorbent, heat stabilizer, flame retardant, internal mold release agent, inorganic additive, antistatic agent, surface wettability improver, incineration aid, pigment, lubricant, natural matter, etc. The amount of the additive varies, depending on its type and object. In general, it preferably falls between 0.05 and 5% by weight.

For example, an inorganic additive or a lubricant (e.g., aliphatic carboxylic acid amide) may be added to the resin composition for improving the blocking resistance and the slidability in inflation molding or T-die extrusion molding of the resin composition into films or sheets.

The inorganic additive includes, for example, silica, calcium carbonate, talc, kaolin, kaolinite, titanium oxide, zinc oxide, etc. Silica and calcium carbonate are especially preferred. One or more of these may be used herein either singly or as combined.

The organic additive includes, for example, starch and its derivatives, cellulose and its derivatives, pulp and its derivatives, paper and its derivatives, wheat flour, tofu refuse, bran, palm shells, coffee refuse, protein, etc. One or more of these may be used herein either singly or as combined.

[Moldings and Method for Producing Them]:

One advantage of the lactic acid-based resin composition of the invention is that any known molding method applies to it. Not specifically defined, its moldings include, for example, films, sheets, monofilaments, multifilaments such as fibers and nonwoven fabrics, injection moldings, blow moldings, laminates, foams, thermoformings such as vacuum formings, etc.

Including those producible in any known molding method, the moldings of the lactic acid-based resin composition of the invention are not specifically defined in point of the shape, size, thickness, design, etc. The moldings of the invention have a characteristic which is excellent in impact strength.

For producing the moldings thereof, any and every molding method may apply to the lactic acid-based resin composition of the invention, including, for example, injection molding, blow molding (injection stretch blow molding, extrusion stretch blow molding, direct blow molding), balloon molding, inflation molding, coextrusion, calendering, hot pressing, solvent casting, (stretch) extrusion molding, extrusion lamination with paper or aluminium, contour extrusion molding, thermoforming such as vacuum (or under pressure) forming, melt spinning (for monofilament or multifilament, spun-bonding or melt-blowing), split yarn molding, foam molding such as extrusion foaming or in-mold foaming, compression molding, etc.

The melt tension of the lactic acid-based resin composition of the invention is relatively large, and therefore the resin composition is favorable to blow molding (extrusion stretch blow molding, direct blow molding), balloon molding, inflation molding, coextrusion, calendering, extrusion molding, extrusion lamination, contour extrusion molding, extrusion foam molding, etc.

[Method for Producing Paper Laminate]:

The extrusion lamination apparatus to be used for producing laminates, for example, paper laminates of the lactic acid-based resin composition of the invention essentially comprises an extruder for melt-kneading the resin, a T-die connected to the extruder for extruding the resin melt out of it, a laminate roll for laminating the extruded melt resin on a paper substrate, and a winder for winding the formed laminate.

The resin composition of the invention has a characteristic in that it well adheres to paper to have a high adhesion strength even at relatively low temperatures as compared with ordinary resin temperatures in extrusion lamination of other popular resin such as polyethylene onto paper. In lamination with it, therefore, the resin temperature preferably falls between 180° C. and 300° C. The thickness of the layer of the resin composition of the invention may vary depending on the use of the laminates. In general, it preferably falls between 5 and 200 µm, more preferably between 10 and 100 µm.

The resin composition of the invention has good moldability, and is therefore stably moldable to a thickness of at least 10 µm, as will be obvious in the Examples mentioned below.

[Paper Substrate]:

The paper substrate for the paper laminate may be any and every type of paper heretofore generally used in the field of wrapping and packaging industry. Concretely, it includes kraft paper, simili, roll paper, medium-duty paper, board, glassine paper, parchment paper, art paper, cross-grain paper, paper for corrugated cardboard, other plate paper, etc. The basis weight (JIS P-8124) of the paper substrate varies depending on the quality thereof. In general, it preferably falls between 10 and 1000 g/m², more preferably between 30 and 700 g/m².

[Surface Treatment of Paper Substrate]:

The paper substrate for use in the invention may be surface-treated in any per-se known manner for improving its adhesiveness. For example, its surface to be coated with a melt resin film may be pre-treated through corona discharging. If desired, it may be pre-treated with a known anchor-coating agent.

[Use of Resin Moldings]:

The moldings of the lactic acid-based resin composition of the invention are usable for bottles, films, sheets, hollow tubes, laminates, vacuum (or pressure)-formed containers, (mono, multi)filaments, nonwoven fabrics, foams, and their secondary-worked articles for use in the field of wrapping and packaging industry, agriculture, civil engineering and fisheries.

For use in the field of wrapping and packaging industry, for example, there are mentioned shopping bags, paper laminate bags, shrink films, wrapping and packaging films for magnetic tape cassettes for videos and audios, wrapping and packaging films for flexible discs, films for plate making, wrapping and packaging bands, adhesive tapes, tapes, yarns, lunch boxes, containers for cooked foods, packaging films for foods and confectionery, wrapping films for foods, wrapping films for cosmetics and aromatics, diapers, sanitary napkins, wrapping films for medical use, wrapping films for pharmaceutical use, wrapping films for surgical external preparations for stiff shoulders or sprains, and other various wrapping and packaging films for foods, electronic appliances, medical instruments, medicines, cosmetics, etc.

For use in the field of agriculture, civil engineering and fisheries, for example, there are mentioned films for agriculture and horticulture, wrapping films for agricultural chemicals, films for greenhouses, fertilizer bags, pots for culturing seedlings, waterproof sheets, sandbags, films for construction, sheets for preventing weeds, vegetation nets formed of tapes or yarns, etc. In addition, the resin composition is further usable for garbage bags, compost bags and others, and its applications cover a wide range.

EXAMPLES

The invention is described in more detail with reference to the following Examples, to which, however, the invention is not limited and may be changed or modified in any desired manner not overstepping the technical scope thereof.

Production Example 1:

400 kg of L-lactide, 0.04 kg of stannous octanoate, and 0.12 kg of lauryl alcohol were charged into a thick-wall cylindrical stainless polymerization reactor equipped with a stirrer, and degassed for 2 hours in vacuum. Purged with nitrogen gas, the resulting mixture was heated at 200° C. under 10 mmHg for 2 hours with stirring.

After the reaction, a melt of polylactic acid was taken out of the take-out mouth at the bottom, cooled in air, and cut with a pelletizer. Thus obtained, the amount of the polylactic acid was 340 kg (yield, 85%), and the weight average molecular weight (Mw) of the polymer was 138,000.

Production Example 2:

100 kg of 90% L-lactic acid and 450 g of tin powder were charged into a reactor equipped with a Dean-Stark trap, and heated at 150° C. under 50 mmHg for 3 hours with stirring while water was distilled out, and then this was further stirred at 150° C. under 30 mmHg for 2 hours for oligomerization. To the oligomer, added was 210 kg of diphenyl ether and reacted at 150° C. under 35 mmHg for azeotropic dehydration. The distilled water and solvent were separated in Dean-Stark trap, and the solvent only was returned to the reactor. After 2 hours, the organic solvent to be returned to the reactor was passed through a column filled with 46 kg of Molecular Sieve 3A before being returned to the reactor. In that condition, the reaction was continued for 20 hours at 130° C. under 17 mmHg to obtain a solution of polylactic acid having a weight average molecular weight (Mw) of 150,000. The solution was diluted with 440 kg of dehydrated diphenyl ether added thereto, and then cooled to 40° C., and the precipitated crystal was taken out through filtration. With 120 kg of 0.5 N HCl and 120 kg of ethanol added thereto, this was stirred at 35° C. for 1 hour, and then filtered. This was dried at 60° C. under 50 mmHg, and 61 kg (yield, 85%) of polylactic acid powder was obtained.

The powder was melted in an extruder and pelletized into pellets of polylactic acid. The polymer had a weight average molecular weight (Mw) of 147,000.

Production Example 3:

Production of Polybutylene Succinate:

293.0 kg of diphenyl ether and 2.02 kg of tin metal were added to 50.5 kg of 1,4-butanediol and 66.5 kg of succinic acid, and heated with stirring at 130° C. under 140 mmHg for 7 hours for oligomerization while water was distilled out of the system. A Dien-Stark trap was fitted to the reactor, and the oligomer was further heated at 140° C. under 30 mmHg for 8 hours for azeotropic dehydration. Then, a tube filled with 40 kg of Molecular Sieve 3A was fitted to it so that the distilled solvent could be returned to the reactor after having passed through the Molecular Sieve tube, and this was further stirred at 130° C. under 17 mmHg for 49 hours. The reaction mass was dissolved in 600 liters of chloroform, and poured into 4 kiloliters of acetone for reprecipitation. This was sludged with an isopropyl alcohol (IPA) solution of HCl (having an HCl concentration of 0.7% by weight) for 0.5 hours, and then filtered. The resulting cake was washed with IPA and then dried at 60° C. under reduced pressure for 6 hours to obtain polybutylene succinate (PSB). The polymer had a weight average molecular weight (Mw) of 140,000, and its yield was 92%.

Production Example 4:

Production of Polyhydroxycaproic Acid:

Polyhydroxycaproic acid (weight average molecular weight Mw, 150,000; yield, 90%) was obtained in the same manner as in Example 2 except that 6-hydroxycaproic acid was used in place of lactic acid.

The weight average molecular weight (Mw) and other physical properties of the samples in Examples and Comparative Examples were measured according to the methods mentioned below.

<1> Weight Average Molecular Weight (Mw):

Measured through gel permeation chromatography (GPC) based on a standard, polystyrene. The column temperature is 40° C. The eluent is chloroform.

<2> Mechanical Strength (Strength, Elasticity (Flexibility) and Elongation of Laminate):

Measured according to JIS K-6732.

<3> Folding Endurance:

Measured according to JIS P-8115.

<4> Glossiness:

Measured according to JIS P-8142 using a digital gloss meter by Suga Test Instruments.

<5> Water Vapor Permeability:

Measured according to JIS Z-0208.

<6> Interlaminar Adhesion Strength:

The resin layer is peeled from the paper substrate at a peeling angle of 90° (T-peel). The peeling speed is 300 mm/min, and the width of the test sample is 15 mm. The peeling strength thus measured indicates the adhesion strength between the resin layer and the paper substrate.

<7> Heat-seal (HS) Strength:

Two pieces of the same sample are heat-sealed by heating one side thereof at a predetermined temperature under a pressure of 0.2 MPa for a period of 1 second, with their resin layers facing each other. The sealed pieces are peeled from each other at a peeling angle of 90° (T-peel). The peeling speed is 300 mm/min, and the width of the sample is 15 mm. The peeling strength thus measured indicates the heat-seal strength of the sample. The test pieces are sampled from the center part of the paper laminate to be tested.

<8> Hot-tack (HT) Strength:

Two pieces of the same sample are heat-sealed by heating two sides thereof at a predetermined temperature under a pressure of 0.28 MPa for a period of 1 second, with their resin layers facing each other. Immediately, the sealed pieces are peeled from each other at a peeling angle of 90° (T-peel). The peeling speed is 1000 mm/min, and the width of the sample is 25 mm. The peeling strength thus measured in 0.187 seconds after the sealing indicates the hot-tack strength of the sample. The test pieces are sampled from the center part of the paper laminate to be tested.

<9> Surface Smoothness:

The surface smoothness of the resin face is measured according to JIS P-8119.

<10> Izod Impact Strength

Izod impact strength of ASTM test piece obtained by extrusion molding of the lactic acid-based resin composition was measured according to ASTM-D256.

Example 1

80 parts by weight of the polylactic acid obtained in Production Example 1 and 20 parts by weight of ethylene-methacrylic acid copolymer ionomer (having a methacrylic acid content of 10% by weight, a degree of neutralization with zinc cation of 73%, and a melt index at 190° C. of 1.0 g/10 min) were pre-dried with hot air and then mixed. The resulting mixture was melt-kneaded in a 30 mmφ twin-screw extruder at a preset cylinder temperature of 180° C., and pelletized into pellets of a lactic acid-based resin composition. The melt tension of the thus-obtained, lactic acid-based resin composition at 190° C. was 18 mN, the elongation thereof was 540 times, and the melt index thereof was 7.7 g/10 min. Further, Izod impact strength was 32 J/m.

The pellets were further dried at 80° C. for 10 hours, and then extruded out through a 40 mmφ extruder equipped with a coathanger T-die (having a width of 460 mm and a lip aperture of 0.8 mm) onto an OPET substrate at a resin temperature of 210° C. and at a take-up speed of 27 m/min to produce a single-layer cast film. Regarding the working condition in this stage, no selvage fluctuation was seen and the film-forming workability of the resin pellets was good. The mean thickness of the thus-obtained single-layer cast film was 37 μm, and the effective width of the film falling within a thickness accuracy range of ±2 μm was 98%.

Examples 2 and 3

Single-layer cast films of the lactic acid-based resin composition were produced in the same manner as in Example 1 except that the take-up speed was changed to 55 m/min or 90 m/min. The mean thickness of the films was 21 and 13 μm; and the effective width of each film falling within a thickness accuracy range of ±1 μm was 97% and 93%.

Comparative Examples 1 to 3

Single-layer cast films of polylactic acid were produced in the same manner as in Examples 1 to 3 except that only the polylactic acid obtained in Production Example 1 was used for the resin and the take-up speed was 27, 55 or 90 m/min. Regarding the working condition in this stage, selvage fluctuation was noticeable and the selvage on the two sides partly curled.

In particular, when the take-up speed was 90 m/min, the selvage fluctuation was too great and the film could not be formed. The mean thickness of the polylactic acid single-layer cast films taken up at a speed of 27 or 55 m/min was 30 and 20 μm; and the effective width of each film falling within a thickness accuracy range of ±5 μm was 65% and 82%. The thickness of these films was not uniform. The melt index at 190° C. of the polylactic acid obtained in Production Example 1 was 7.7 g/10 min. However, the melt tension and the elongation of the polymer could not be measured since the tension thereof in melt was too low. Izod impact strength was 26 J/m.

Example 4

In the same manner as in Example 1 except that the lactic acid-based resin composition was extruded out not onto OPET but onto corona-treated kraft paper (having a weight of 50 g/m$^2$), a paper laminate was produced. The thickness of the resin layer of the paper laminate was 37±2 μm. Like in Example 1, the film-forming workability of the resin composition was good, and the effective width of the resin layer falling within a thickness accuracy range of ±2 μm was 97%. The data of the interlaminar adhesion strength, the heat-seal strength, the hot-tack strength, the mechanical strength, the folding endurance, the surface smoothness, the gloss value and the moisture vapor permeability of the paper laminate obtained herein are qiven in Table 1.

Example 5

A paper laminate was produced in the same manner as in Example 4 except that the take-up speed was changed to 55 m/min. The thickness of the resin layer of the paper laminate was 21±1 μm. Like in Example 2, the film-forming workability of the resin composition was good, and the effective width of the resin layer falling within a thickness accuracy range of ±1 μm was 95%. The data of the interlaminar adhesion strength, the heat-seal strength, the hot-tack strength, the mechanical strength, the folding endurance, the surface smoothness, the gloss value and the moisture vapor permeability of the paper laminate obtained herein are given in Table 1.

Comparative Examples 4 and 5

Paper laminates were produced in the same manner as in Examples 4 and 5 except that only the polylactic acid obtained in Production Example 1 was used. The thickness of the resin layer of the paper laminates was 30±5 μm or 20±5 μm. Regarding the working condition in this stage, selvage fluctuation was noticeable in the resin layer and, since the selvage on the two sides of the resin layer curled, the resin layer could not almost adhere to the paper substrate in the center part, as so mentioned hereinunder. The effective width of each film falling within a thickness accuracy range of ±5 μm was 66% and 81%. The data of the interlaminar adhesion strength, the heat-seal (HS) strength, the hot-tack (HT) strength, the mechanical strength, the folding endurance, the surface smoothness, the gloss value and the moisture vapor permeability of the paper laminates obtained herein are given in Table 1.

Example 6

Using a twin-screw extruder, 60 parts of the polylactic acid of Production Example 1 and 40 parts of the polybutylene succinate of Production Example 3 were extruded out at a resin temperature of from 190 to 210° C. and pelletized. The resulting pellets were dried at 80° C. for 4 hours to obtain a lactic acid-based resin of polylactic acid and polybutylene succinate. 85% by weight of the lactic acid-based resin and 15% by weight of ethylene-methacrylic acid copolymer ionomer (having a methacrylic acid content of 10% by weight, a degree of neutralization with zinc cation of 73%, and a melt index at 190° C. of 1.0 g/10 min) were pre-dried with hot air and then mixed. The resulting mixture was melt-kneaded in a 30 mmϕ twin-screw extruder at a preset cylinder temperature of 180° C., and pelletized into pellets of a lactic acid-based resin composition. The melt tension of the thus-obtained, lactic acid-based resin composition at 190° C. was 19 mN, the elongation thereof was 500 times, and the melt index thereof was 7.3 g/10 min. The pellets were further dried at 80° C. for 10 hours, and then extruded out through a 40 mmϕ extruder equipped with a coathanger T-die (having a width of 460 mm and a lip aperture of 0.8 mm) onto an OPET substrate at a resin temperature of 210° C. and at a take-up speed of 90 m/min to produce a single-layer cast film. Regarding the working condition in this stage, no selvage fluctuation was seen and the film-forming workability of the resin pellets was good. The mean thickness of the thus-obtained single-layer cast film was 35 μm, and the effective width of the film falling within a thickness accuracy range of ±2 μm was 97%.

Example 7

A single-layer cast film was produced in the same manner as in Example 6 except that Bionole #3001 (trade name of polybutylene succinate adipate by Showa Polymer) was used in place of polybutylene succinate. The melt tension of the lactic acid-based resin composition at 190° C. was 22 mN, the elongation thereof was 570 times, and the melt index thereof was 5.5 g/10 min.

Regarding the working condition in forming the single-layer cast film, no selvage fluctuation was seen and the film-forming workability of the resin pellets was good. The mean thickness of the single-layer cast film was 35 μm, and the effective width of the film falling within a thickness accuracy range of ±2 μm was 99%.

Example 8

A single-layer cast film was produced in the same manner as in Example 6 except that the polyhydroxycaproic acid of Production Example 4 was used in place of polybutylene succinate. The melt tension of the lactic acid-based resin composition at 190° C. was 18 mN, the elongation thereof was 500 times, and the melt index thereof was 6.5 g/10 min.

Regarding the working condition in forming the single-layer cast film, no selvage fluctuation was seen and the film-forming workability of the resin pellets was good. The mean thickness of the single-layer cast film was 33 μm, and the effective width of the film falling within a thickness accuracy range of ±2 μm was 96%.

Example 9

A single-layer cast film was produced in the same manner as in Example 6 except that Celgreen PH-7 (trade name of polycaprolactone by Daicel) was used in place of polybutylene succinate. The melt tension of the lactic acid-based resin composition at 190° C. was 22 mN, the elongation thereof was 570 times, and the melt index thereof was 5.5 g/10 min.

Regarding the working condition in forming the single-layer cast film, no selvage fluctuation was seen and the film-forming workability of the resin pellets was good. The mean thickness of the single-layer cast film was 33 μm, and the effective width of the film falling within a thickness accuracy range of ±2 μm was 95%.

Example 10

A single-layer cast film was produced in the same manner as in Example 6 except that Ecoflex (trade name of modified PBT by BASF) was used in place of polybutylene succinate. Regarding the working condition in forming the single-layer cast film, no selvage fluctuation was seen and the film-forming workability of the resin pellets was good. The mean thickness of the single-layer cast film was 33 μm, and the effective width of the film falling within a thickness accuracy range of ±2 μm was 99%.

TABLE 1

| | Examples | | Comparative Examples | |
|---|---|---|---|---|
| | 4 | 5 | 4 | 5 |
| Interlaminar Adhesion Strength (N/15 mm) | Center 0.6 edge 0.8 | center 0.3 edge 0.6 | center 0.1 edge 0.9 | center 0.1 edge 0.8 |
| HS Strength (N/15 mm) | | | | |
| 90° C. | 0.3 | 0.4 | 0.1 | 0.5 |
| 110° C. | 3.2 | 4.1 | 1.4 | 2.5 |
| 120° C. | 4.2 | 5.5 | 2.9 | 2.9 |
| HT Strength (N/25 mm) | | | | |
| 80° C. | 2.6 | not measured | 2.1 | not measured |
| 90° C. | 3.3 | | 2.6 | |
| 100° C. | 2.8 | | 2.3 | |
| Mechanical Strength (MD/TD)(MPa) | 55/25 | 55/15 | 55/25 | 55/20 |
| Folding Endurance (MD/TD)(MPa) | 1100/300 | 1100/250 | 1250/250 | 1280/230 |
| Surface Smoothness (sec) | 105 | 100 | 150 | 150 |
| Gloss value (%) | 48 | 45 | 85 | 86 |
| Moisture vapor Permeability (g/m²/day) | 100 | 170 | 190 | 320 |

Notes:
<1> The mechanical strength is at break.
<2> MD is machine direction, and TD is transverse direction.

Example 11

80 parts by weight of the polylactic acid obtained in Production Example 2 and 20 parts by weight of ethylene-methacrylic acid copolymer ionomer (having a methacrylic acid content of 10% by weight, a degree of neutralization with zinc cation of 73%, and a melt index at 190° C. of 1.0 g/10 min) were pre-dried with hot air and then mixed. The resulting mixture was melt-kneaded in a 30 mmφ twin-screw extruder at a preset cylinder temperature of 180° C., and pelletized into pellets of a lactic acid-based resin composition.

The pellets were further dried at 80° C. for 10 hours, and then extruded out through a 65 mmφ extruder equipped with a straight manifold-type T-die (having a width of 500 mm and a lip aperture of 0.8 mm) onto an corona-treated kraft paper (having a weight of 50 g/m$^2$) at a resin temperature of 230° C. and at a take-up speed of 80 m/min to produce a paper laminate having 30 μm and 20 μm in a thickness of the resin layer. The data of the interlaminar adhesion strength, the heat-seal (HS) strength, the hot-tack (HT) strength of the paper laminates obtained herein are given in Table 2.

Comparative Example 6

80 parts by weight of the polylactic acid obtained in Production Example 2 and 20 parts by weight of ethylene-ethyl acrylate copolymer (having a ethyl acrylate content of 10% by weight and a melt index at 190° C. of 25 g/10 mm) were pre-dried with hot air and then mixed. The resulting mixture was melt-kneaded in a 30 mmφ twin-screw extruder at a preset cylinder temperature of 180° C., and pelletized into pellets of a lactic acid-based resin composition. When the melt properties of the obtained lactic acid-based resin composition were measured, scattering of data occurred based on its poor compatibility. The melt tension of the lactic acid-based resin composition at 190° C. was 6 to 22 mN, the elongation thereof was 7000 times or more, and reliable data were not obtained. And the melt index thereof was 14 g/10 min. Further, in Izod impact test, the reliable data could not be obtained since interlaminar peelings occurred in test pieces.

Comparative Example 7

Paper laminate was produced in the same manner as in Examples 11 except that the only low density polyethylene (having a density of 923 kg/m$^3$ and a melt index at 190° C. of 3.7 g/10 mm) was used, a resin temperature was 320° C. and a take-up speed was 80 m/min. The thickness of the resin layer of the paper laminates was 30 μm and 20 μm. The data of the interlaminar adhesion strength, the heat-seal (HS) strength, the hot-tack (HT) strength of the paper laminates obtained herein are given in Table 2.

TABLE 2

| | Example 11 | | Comparative Example 7 | |
|---|---|---|---|---|
| | 30 μm | 20 μm | 30 μm | 20 μm |
| Interlaminar Adhesion Strength (N/15 mm) | Center 0.9 edge 0.9 | Center 0.8 edge 0.8 | Center 0.9 edge 0.9 | Center 0.8 edge 0.8 |
| HS Strength (N/15 mm) | | | | |
| 110° C. | not measured | 7.6 | 0 | 0 |
| 120° C. | | 9.3 | 1.1 | 1.9 |
| 130° C. | | 9.5 | 7.9 | 7.5 |
| 140° C. | | 10.5 | 9.1 | 7.4 |
| HT Strength (N/25 mm) | | | | |
| 80° C. | 1.8 | 2.5 | 0.8 | 0.3 |
| 90° C. | 4.4 | 2.7 | 0 | 0.1 |
| 100° C. | 5.8 | 3.2 | 0 | 1.0 |
| 110° C. | 5.9 | 3.4 | 0.1 | 1.4 |

Effect of the Invention

As described in detail hereinabove with reference to its preferred embodiments, the lactic acid-based resin composition of the invention has good physical properties in melt and can be efficiently formed into films and laminates through casting or extrusion lamination. The paper laminates obtained through extrusion lamination with the resin composition have good moisture barrier property, and have the advantages of good antibacterial ability, good biodegradability and low combustion heat. And the moldings obtained from the lactic acid-based resin composition of the invention have a characteristic which is excellent in impact strength. Further, the films and sheets formed of the lactic acid-based resin composition of the invention have good low-temperature heat-sealability and hot-tack sealability, and the resin composition well serves as a sealant. Accordingly, the lactic acid-based resin composition of the invention is favorable to various materials in a broad range, for example, for wrapping and packaging materials for foods, drinks, electronic appliances, medicines and cosmetics, for materials for use in agriculture, civil engineering and construction and for materials for compost, etc.

The invention claimed is:

1. A lactic acid-based resin composition comprising a lactic acid-based resin (component (A)), and an ethylene-unsaturated carboxylic acid copolymer (component (B)) and/or an ethylene-unsaturated carboxylic acid copolymer ionomer (component (C)).

2. A molding formed of the lactic acid-based composition according to claim 1.

3. A single-layer film formed of the lactic acid-based resin composition according to claim 1.

4. A laminate containing a layer formed of the lactic acid-based resin composition according to claim 1.

5. A paper laminate containing a layer formed of the lactic acid-based resin composition according to claim 1 and a paper layer.

6. A method for producing paper laminates comprising mixing a lactic acid-based resin (component (A)) with an ethylene-unsaturated carboxylic acid copolymer (component (B)) and/or an ethylene-unsaturated carboxylic acid copolymer ionomer (component (C)), and followed by melt-extruding the resulting lactic acid-based resin composition onto a paper layer to produce a paper laminate that comprises the resin layer and the paper layer.

* * * * *